J. W. NIEUKIRK.
AEROPLANE SHELL.
APPLICATION FILED MAY 20, 1918.

1,344,558.

Patented June 22, 1920.
5 SHEETS—SHEET 1.

Witness

Inventor
J. W. Nieukirk
By Victor J. Evans
Attorney

J. W. NIEUKIRK.
AEROPLANE SHELL.
APPLICATION FILED MAY 20, 1918.

1,344,558.

Patented June 22, 1920.
5 SHEETS—SHEET 2.

Inventor
J. W. Nieukirk

Witness

By Victor J. Evans
Attorney

J. W. NIEUKIRK.
AEROPLANE SHELL.
APPLICATION FILED MAY 20, 1918.

1,344,558.

Patented June 22, 1920.
5 SHEETS—SHEET 4.

Inventor
J. W. Nieukirk

Witness
By Victor J. Evans
Attorney

J. W. NIEUKIRK.
AEROPLANE SHELL.
APPLICATION FILED MAY 20, 1918.
1,344,558.
Patented June 22, 1920.
5 SHEETS—SHEET 5.
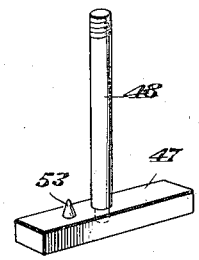
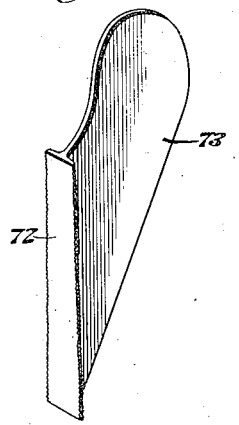
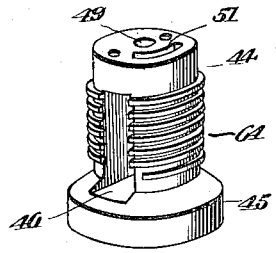
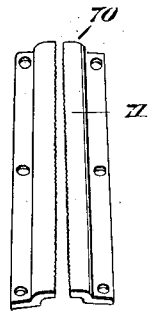
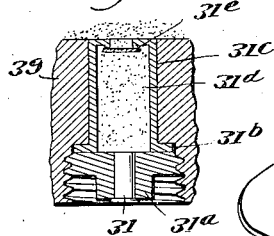
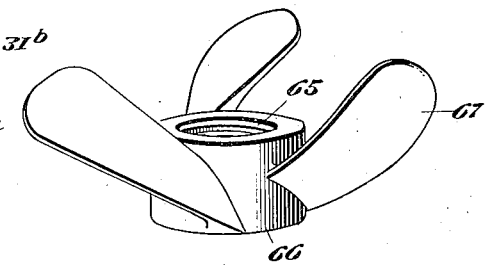
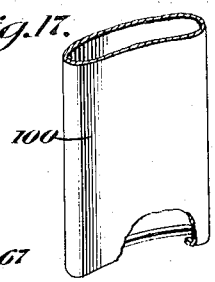
Inventor
J. W. Nieukirk
By Victor J. Evans
Attorney
Witness

UNITED STATES PATENT OFFICE.

JOHN W. NIEUKIRK, OF GARY, INDIANA.

AEROPLANE-SHELL.

1,344,558.

Specification of Letters Patent.   Patented June 22, 1920.

Application filed May 20, 1918.   Serial No. 235,470.

*To all whom it may concern:*

Be it known that I, JOHN W. NIEUKIRK, a citizen of the United States, residing at Gary, in the county of Lake and State of Indiana, have invented new and useful Improvements in Aeroplane-Shells, of which the following is a specification.

This invention relates to improvements in explosive shells primarily intended to be dropped or thrown from air craft, and has for its primary object to provide a shell of this character with means for preventing the exploding thereof until after the same has reached a safe distance from the air craft as well as to insure certainty of explosion either by impact or by a slow fuse, under all conditions, that is to say above ground or below water.

Other objects and advantages will present themselves as the nature of the invention is disclosed, reference being had to the accompanying drawings in which there is exemplified a satisfactory embodiment of the improvement.

In the drawings,

Fig. 11 is a perspective view of the hammer.

Fig. 12 is a perspective view of the hammer carrying casting.

Fig. 13 is a perspective view of a hammer actuating fan or propeller.

Fig. 14 is a perspective view of one of the stabilizer blades.

Fig. 15 is a similar view of one of the brackets.

Fig. 16 is a greatly enlarged detail sectional view approximately on the line 16—16 of Fig. 6.

Fig. 17 is a fragmentary perspective view of the case for holding the charge between the cap piece and the chamber for the high explosive.

Figure 1:
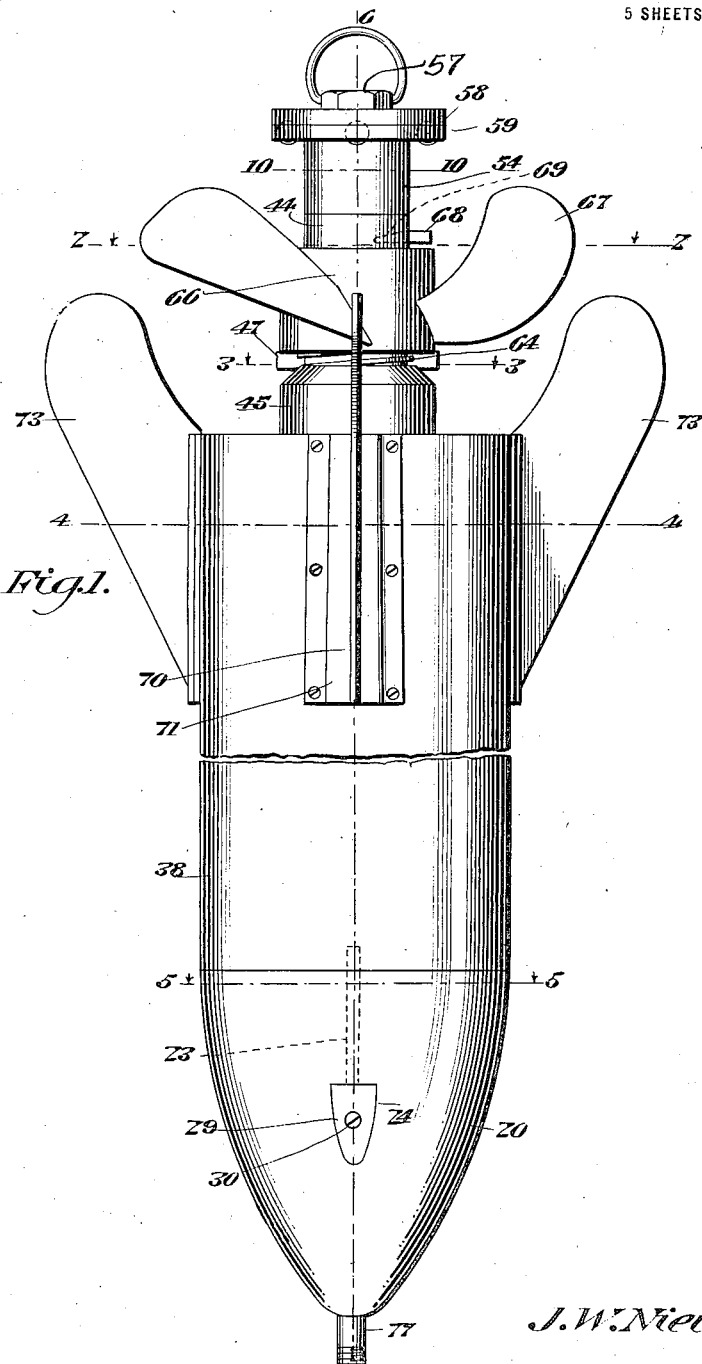
Figure 1 is an elevation of a projectile constructed in accordance with this invention.
Figure 2:
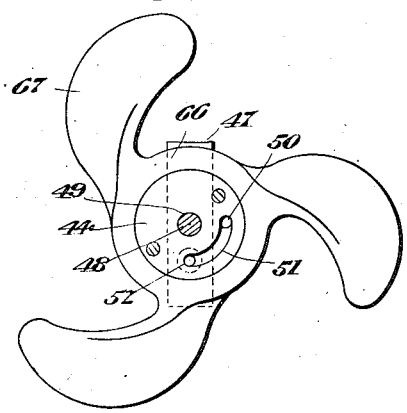
Fig. 2 is a sectional view approximately on the line 2—2 of Fig. 1.
Figure 4:
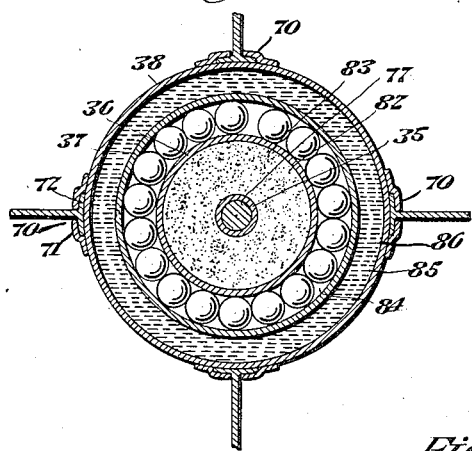
Fig. 4 is a sectional view approximately on the line 4—4 of Fig. 1.
Figure 5:
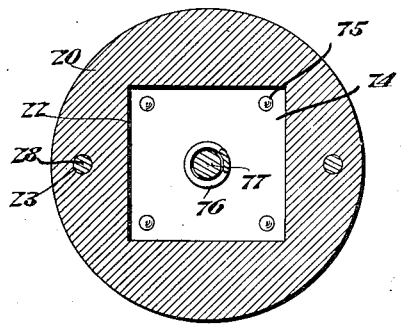
Fig. 5 is a sectional view approximately on the line 5—5 of Fig. 1.
Figure 3:
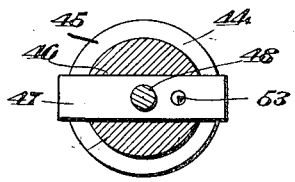
Fig. 3 is a sectional view approximately on the line 3—3 of Fig. 1.
Figure 6:
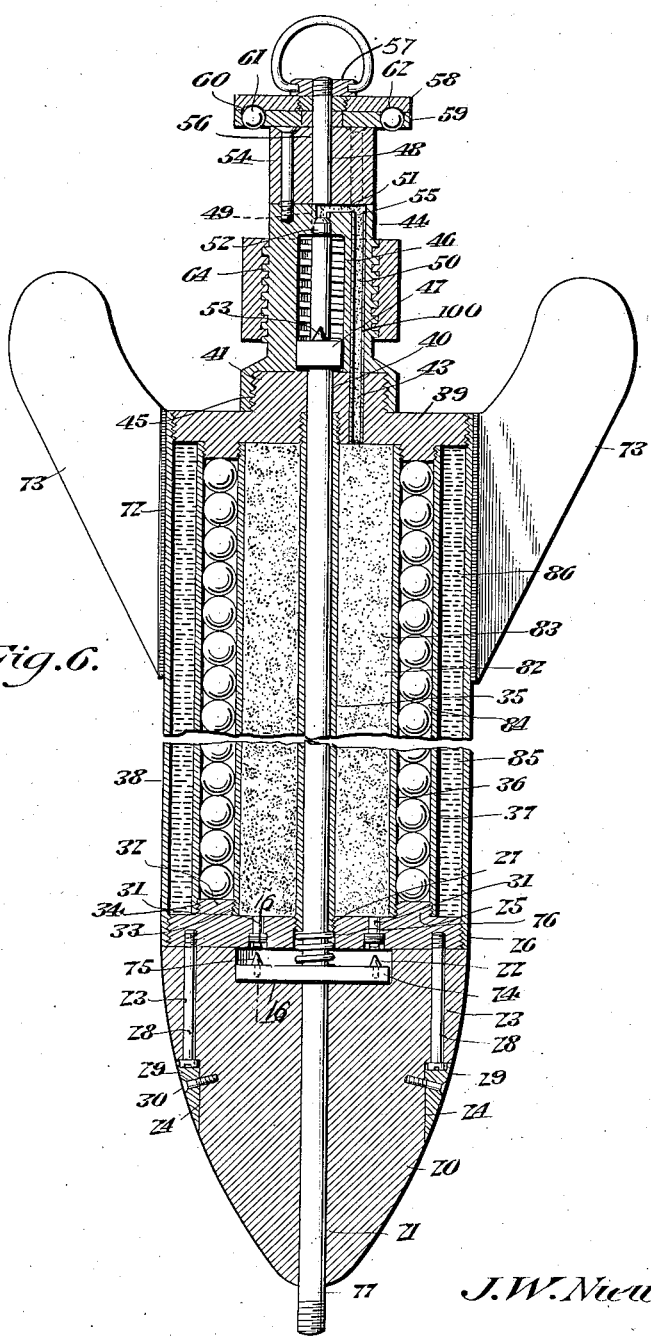
Fig. 6 is a sectional view approximately on the line 6—6 of Fig. 1.
Figure 10:
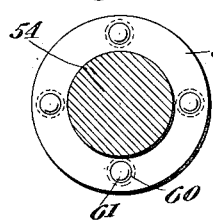
Fig. 10 is a sectional view approximately on the line 10—10 of Fig. 1.
Figure 7:
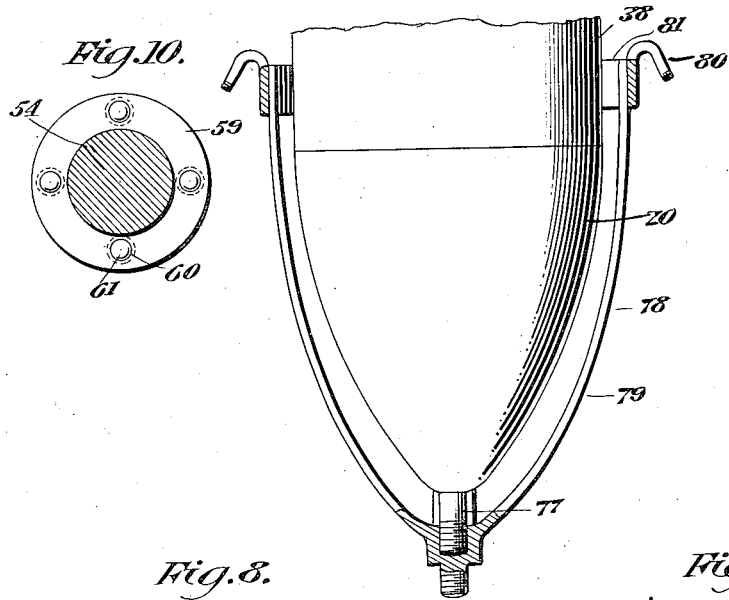
Fig. 7 is a detail sectional view illustrating the projectile provided with an auxiliary nose.
Figure 8:
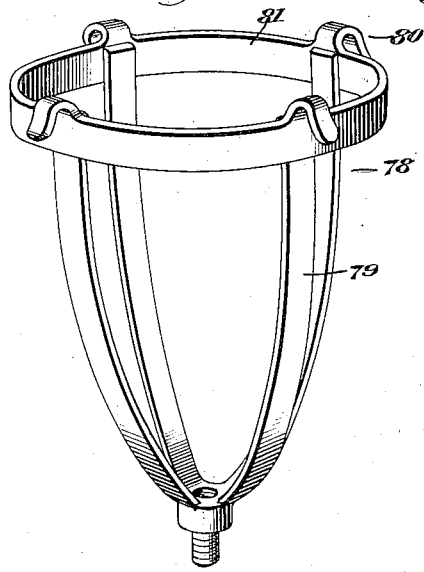
Fig. 8 is a perspective view of the auxiliary nose.
Figure 9:
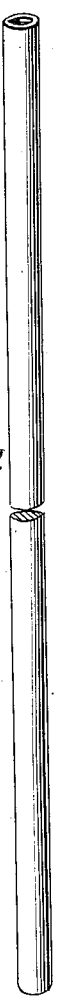
Fig. 9 is a perspective view of an extension for the detonator rod, which may be employed when the projectile is to be exploded above the ground or above the surface contacted.

The nose portion of the shell is indicated by the numeral 20 and is preferably in the nature of a casting, the same having a central opening 21 entering from its outer end and communicating with the square or rectangular pocket 22 formed on the inner end of the nose piece. The nose piece, adjacent the sides thereof and preferably arranged in right angular relation with each other, is formed with longitudinal openings 23, the sides of the shell being formed with notches 24 at the outer ends of the said openings 23, it being understood that the nose piece is of a substantially frusto-conical formation, as clearly shown by the drawings. On the inner and flat end of the nose piece 20 is arranged a disk 25 that is provided on its periphery with threads 26 and that is also provided with a central opening 27 that communicates with the pocket 22 and with the central opening 21 in the nose piece. The disk is also provided with threaded apertures, alining with the openings 23, and through these openings 23 and engaging with the referred to threaded apertures in the disks are bolts 28, the heads of the bolts being received in the notches 24 and being concealed by filler members 29 that are arranged in the said notches and removably secured by screws 30 to the nose piece.

The disk 25 provides a cap piece or head for the nose 20 and has, at a suitable distance from its center right angularly disposed openings, the face of the disk next to the nose being formed with depressions surrounding the openings, and within these openings are arranged primer caps 31. The outer face of the disk, inward of its threaded periphery 26 and outward of the openings forming the pockets for the primer caps 31, is formed with a round flange 32 having its inner periphery threaded as at 33 and its outer periphery likewise threaded as at 34. The opening 27 is threaded for a portion of its length, and these threads engage with male threads on one of the ends of a tube 35. The threads 33 of the disk 25 are engaged by threads on one end of a cylinder 36, the threads 34 on the said flange being engaged by female threads on a second cylinder 37, and the peripheral threads of the disk 25 are engaged by female threads on one of the ends of a cylinder 38, the last mentioned cylinder forming the outer member of the case of the shell. The tube 35 and the cylinder 38 are of a greater length than the cylinders 36 and 37, the tube being of a less length than the cylinder 38, and the reason for this arrangement will presently be apparent. The primer caps 31 are received in central openings in peripherally threaded members 31ᵃ that are screwed in suitable threaded openings in the disk 25. The members 31ᵃ are preferably provided, upon their outer faces with central bosses or enlargements whereby the same may be readily attached to the referred to threaded openings in the disk. The inner faces of the members 31ᵃ contact with outstanding flanges 31ᵇ upon the lower ends of booster charge holding casings 31ᶜ, the booster charge in the said casing being indicated by the numeral 31ᵈ. The flange 31 prevents the casing 31ᶜ being projected entirely through the disk 25. The inner end of each of the casings 31ᶜ is provided with an inturned flange forming a central opening in this end of the case, and this opening is closed by a strip of paraffin paper or the like which is indicated by the numeral 31ᵉ and which separates the booster charge from the high explosive charge, which will hereinafter be referred to.

The cap plate or disk for the body of the shell is indicated by the numeral 39 and comprises a member which is round in plan and which is provided with peripheral threads that engage with interior threads on the outer end of the cylinder 38. The cap 39 is centrally provided with an opening 40 which is threaded for a certain portion of its length and these threads engage with threads on the outer end of the tubes 35. The cap, on the inner face thereof is provided with an outstanding annular flange which is threaded upon both its inner and outer surfaces, the inner threads engaging the outer threads on the outer end of the cylinder 36, and the outer threads engaging the threads on the outer end of the cylinder 37, and by this arrangement it will be noted that all of the cylinders, (excepting the tube 35) are closed. The cap 39, upon its outer face is provided with an annular threaded boss 41, the opening 40 extending through the said boss. The cap is provided with an opening 43 that passes through the boss 41 and communicates with the chamber provided between the cylinder 36 and the tube 35.

The hammer carrying casting, which provides the tail piece for the shell is indicated by the numeral 44, the same being round in plan and having its inner end provided with a flanged extension 45 having interior threads which engage with the threads on the boss 41 of the cap piece 39. The tail is provided with a transversely disposed substantially rectangular slot or opening 46 within which is arranged the hammer 47, the said hammer extending through the slot and beyond the sides of the casting 44. The hammer is provided with a stem 48 approximately centrally secured or formed thereon, the said stem extending through a central opening 49 in the tail piece 44.

The tail piece is provided with a longitudinal opening 50 which, when the same is screwed upon the cap piece 39 is designed to register with the opening 43 in the said cap piece, and the outer end of the tail piece 44 is provided with a transverse groove 51 communicating with the opening 50. At the inner end of the groove 51 the cap piece is provided with an opening forming a pocket for a percussion cap 52, the said cap being disposed in the path of contact with a striking pin 53 on the hammer 47. The hammer, being arranged in the slot 46 is held against lateral movement and engagement of the stem thereof with the wall of the opening 49 holds the said hammer against longitudinal movement so that the striking pin 53 will be properly directed to the percussion cap 52. In Fig. 17 of the drawings I have illustrated a case which is designed to be received in the opening 50 and to receive therein the powder charge. This case is substantially similar to the case 31ᶜ and is indicated by the numeral 100.

On the outer end of the tail piece 44 is secured an extension 54 for the said tail piece, the extension being desirable to permit of the proper arrangement of a slow fuse 55 in the groove 51 and also the proper arrangement of the said fuse through the opening 50 in the tail piece and the opening 43 in the cap piece 39, the fuse being directed to the chamber between the cylinder 36 and the tube 35. The extension block 54 of the tail piece is preferably secured to the tail piece by bolts or screws, and the said extension is centrally provided with an opening 56 through which the stem 48 of the hammer 47 extends, the said end of the stem being threaded. The threaded end of the stem is engaged by a nut 57. Between the nut and the outer end of the extension 54 for the tail piece 44 is arranged in anti-frictional ball carrying member which comprises two plates or disks 58 and 59 respectively, the same having alining central openings through which the stem 48 freely passes, the plate 59, being arranged next to the shell is provided with radially spherical openings 60 within which are arranged the anti-frictional balls 61 which project a slight distance beyond the inner face of the said plate 59, the balls being partly received in suitable depressions 62 on the inner face of the plate 58. The plates are connected together in any desired or preferred manner.

The tail piece 44, from its flange 45 is provided, for a suitable distance with outwardly extending spiral threads 64 which are adapted to be engaged by female threads 65 in the bore of a collar 66. This collar has preferably integrally formed on its outer periphery fan plates 67 and the collar is normally retained in contacting engagement with the flange of the tail piece by a locking element in the nature of a pin 68 that is preferably wedge shaped and engages in a wedge shaped opening 69 in the tail piece, outward of the threaded portion 64 thereof. The collar contacts with the projecting ends of the hammer 47 holding the said hammer in one position in the tail piece and away from engagement with the percussion cap 52 for the fuse 55. On the outer face of the cylinder 38 are arranged longitudinally disposed brackets 70 which are in the nature of plates and which are secured to the cylinder in any desired or preferred manner. Preferably these brackets are arranged in right angular relation to each other, four being employed. The brackets are centrally formed with outwardly extending flanges 71, arranged in spaced pairs and which are inclined toward each other from the lower or outer ends of the brackets to the opposite ends thereof, the portions referred to as the lower ends being nearest the nose of the shell. These flanges provide wedge shaped passages for the reception of wedge shaped flanges 72 formed on the opposite sides and at the inner edges of wing members 73. The flanges 72 and the walls provided by the passages or ways in the brackets 70 for the said flanges may be roughened so as to effectively hold the wings on the brackets and on the shell.

In the pocket 22 of the nose 20 is loosely arranged a square plate 74 which is guided by the walls of the said pocket and which is provided with needles or striking pins 75 disposed in the path of engagement with the primer caps 31. It should have been stated that the primer caps communicate with the compartment between the tube 35 and the cylinder 38. The plate is normally retained seated on the inner wall of the pocket through the medium of a helical spring 76 which exerts a tension between the said plate and the disk 25.

The plate 74 is rigidly secured to the detonator rod 77 which extends through the opening 21 in the nose 20, the opening 27 in the disk 25, the tube 35, and the central opening in the cap plate so that its inner end is disposed in contacting engagement with the hammer 47 and its outer end projects a desired distance beyond the nose piece 20.

The outer end of the rod 77 is threaded and may be engaged in a threaded opening in an auxiliary nose piece 78. The auxiliary nose piece 78 is of a basket-like construction, preferably comprising four arms 79 which are rounded outwardly away from each other from the center of the device and which have their outer and spread ends formed or provided with hooks 80, a band 81 being connected to the upper ends of the arms and to the hooks whereby to retain the arms properly spread. The band surrounds the nose piece 20, but is properly spaced therefrom, and the auxiliary nose is desirable should the detonator rod not contact directly with the obstacle aimed at, as for instance when the shell is employed as a bomb and projected or thrown from one air craft at another. The hooks 80 are employed to engage with parts of an article struck so as to hold the shell against such article until the time fuse 55 burns its way to the chamber between the tube 35 and the cylinder 36, the said fuse being ignited in a manner which will presently be described. The hooks 80 will catch on any object and explode the shell by jerking the auxiliary nose upwardly, causing the firing pin attached to the detonator rod to strike the fuse caps and thus instantly explode the shell.

For distinction the compartment or chamber between the tube 35 and the cylinder 36 is indicated by the numeral 82, and this chamber receives a charge of some suitable high explosive which is indicated by the numeral 83. The chamber or compartment between the cylinder 36 and the cylinder 37 is indicated by the numeral 84 and is filled with shrapnel, while the chamber 85, between the cylinder 37 and the outer cylinder or case 38 is filled with an ignitible fluid which is indicated by the numeral 86.

The striking pins 75 on the plate of the detonator rod, as stated are normally held out of contacting engagement with the primer caps 31 by the spring 76, but it will be apparent that should the rod forcibly contact with an obstacle the same will be moved longitudinally moving the plate 74 outward of the pocket 22 and bringing the strinking pin 75 carried thereby against the primer caps 31 detonating the latter exploding the charge in the compartment or chamber 82. This explosion bursts the body of the shell scattering the shrapnel and igniting the inflammable liquid and will greatly damage, if not utterly destroy the obstacle contacted.

Before the shell is dropped or hurled from the air craft, building or ship, the wedge pin 69 is removed, the wings 73 keeping the same in an upright position, the said wings or vanes serving as stabilizers and also serving as ducts or passages for the currents of air which contacting with the fan or propeller 35 will revolve the same causing the said propeller to become unscrewed from the tail-piece 44 to travel over the said tail piece and to extension block 55 thereof and to cause the collar portion 66 of the fan or propeller to contact with the anti-frictional balls so that the turning of the propeller is not materially interfered with. The shell will drop faster than the propeller which is retarded by contact with the currents of air and which, by virtue of contact with the disks 58 and 59, or rather with the anti-frictional balls carried thereby will draw on the stem 48 of the hammer 47, moving the hammer through the slot in the tail piece to bring the striking pin 53 thereof in contact with the percussion cap 52 detonating the latter and igniting the fuse 55 and at the same time releasing the detonator rod 77, to permit of the same exploding the priming caps, as previously described. It is, of course, to be understood, as previously indicated in the description that the stem 48 of the hammer 47 is, through the medium of the nut 57 connected to the anti-frictional ball carrying disks 58 and 59, the same being free from connection from the remainder of the structure. The propeller, when in its first position contacts with the extending ends of the hammer 47 so that the same is held against movement in the direction of the percussion cap 52. After the propeller leaves the threads 64 on the tail piece 44 it will, as previously stated, contact with the anti-frictional balls 61, and by the resistance offered by its wings will be further propelled by the air, drawing the plates 58 and 59 upwardly and outwardly of the shell proper and likewise drawing the stem 48, and consequently the hammer 47 in the direction of the percussion cap 52, bringing the striking pin 53 of the said hammer into contact with the said percussion cap and exploding the same, and in this manner igniting the fuse 55.

When the propeller or fan is locked on the device as previously described the accidental explosion of the shell is impossible. The shell may be used as a depth bomb as the time fuse will explode the same even when the shell is under water and the detonator rod will likewise explode the charge of the shell should the same contact with an obstacle under water. The shell after being dropped or hurled will explode under all conditions so that the same will not prove a future menace as is the case when ordinary shells or projectiles fail to reach a mark, and it is believed the advantages of the construction, for the purpose devised will be apparent without further description. It is thought necessary, however, to emphasize the fact that the hammer when locked by the fan or propeller holds the detonator rod from moving upwardly and striking the primer caps and exploding the shell. This is a very important feature of the invention as the shell can not be exploded by contact when the hammer is locked in position by the fan or propeller.

Having thus described the invention, what I claim is:

1. In an explosive shell, a fuse for the explosive charge thereof, a cap for said fuse, a hammer, a stem thereon, a head for the stem, a rotatable fan designed to be actuated by resistance to air when the shell is projected, said fan normally holding the hammer out of cap engaging position and designed, when actuated to move against the head of the stem to draw on the stem of the hammer to force the latter into cap contacting engagement to explode the latter and ignite the fuse.

2. In an explosive shell, a fuse for the explosive charge thereof, a cap for said fuse, a hammer, a stem for the hammer, a head for the stem, anti-frictional elements carried by the head, a rotatable fan designed to be actuated by resistance to air when the shell is projected normally engaging the hammer to hold the same out of cap contacting position and designed to be brought against the anti-frictional elements of the head to exert an outward pressure against said head to draw on the stem and hammer to bring the latter in cap contacting position when subjected to said air influence.

3. An explosive shell, a threaded tail piece thereon, a fuse carried by said tail piece and communicating with the explosive charge, a cap for the fuse, a hammer slidable through the tail piece, a stem for the hammer passing through the tail piece, a head for the stem, anti-frictional elements carried by the head, a fan engaging the threads of the tail piece and designed to be influenced by air resistance when the shell is projected to move off the tail piece and contact with the head of the hammer to bring the hammer against the cap to explode the latter, and locking means for said fan.

4. In an explosive shell, a fuse for the explosive charge thereof, a cap for the fuse, a hammer, a rotatable fan designed to be influenced by air resistance when the shell is projected normally holding the hammer in one position and designed to influence the hammer to bring the latter in cap contacting position to explode the cap and ignite the fuse, locking means for the fan, a detonator rod for the explosive charge normally contacting with the hammer and retained inactive by such engagement when the hammer is out of cap contacting position, and a nose having hooks thereon connected to the outer end of said detonator rod.

5. In an explosive shell, a fuse for the explosive charge thereof, a cap for the fuse, a hammer, a rotatable fan designed to be influenced by air resistance when the shell is projected normally holding the hammer in one position and designed to influence the hammer to bring the latter in cap contacting position to explode the cap and ignite the fuse, locking means for the fan, a spring influenced detonator rod for the explosive charge normally contacting with the hammer and retained inactive by such engagement when the hammer is out of cap contacting position.

6. In an explosive shell, a body having an explosive charge therein, a threaded tail piece thereon, said tail piece having a slot therethrough, a fuse carried by the latter for the explosive charge, a cap for the fuse, a hammer extending through the slot, a stem for the hammer projecting through the tail piece, a head for the stem, anti-frictional elements carried thereby, a rotatable fan engaging the threads of the tail piece and contacting with the hammer to hold the hammer away from cap contacting position, a removable locking pin between the tail piece and the fan, and said fan designed to be actuated by air resistance when the pin is removed and the shell is projected to cause the said fan to ride off of the tail piece and contact with the head of the hammer stem to move the latter outward of the shell and bring the hammer to cap exploding position.

7. In an explosive shell, a body having an exploding charge therein, a threaded tail piece thereon, said tail piece having a slot therethrough, a fuse carried by the latter for the explosive charge, a cap for the fuse, a hammer extending through the slot, a stem for the hammer projecting through the tail piece, a head for the stem, anti-frictional elements carried thereby, a rotatable fan engaging the threads of the tail piece and contacting with the hammer to hold the hammer away from cap contacting position, a removable locking pin between the tail piece and the fan, and said fan designed to be actuated by air resistance when the pin is removed, and the shell is projected to cause the said fan to ride off of the tail piece and contact with the head of the hammer stem to move the latter outward of the shell and bring the hammer to cap exploding position, and laterally arranged outwardly extending wings on the body of the shell providing therebetween air passages for the fan.

8. In an explosive shell, a body having an explosive charge therein, a threaded tail piece thereon, said tail piece having a slot therethrough, a fuse carried by the latter for the explosive charge, a cap for the fuse, a hammer extending through the slot, a stem for the hammer projecting through the tail piece, a head for the stem, anti-frictional elements carried thereby, a rotatable fan engaging the threads of the tail piece and contacting with the hammer to hold the hammer away from cap contacting position, a removable locking pin between the tail piece and the fan, and said fan designed to be actuated by air resistance when the pin is removed and the shell is projected to cause the said fan to ride off of the tail piece and contact with the head of the hammer stem to move the latter outward of the shell and bring the hammer to cap exploding position, longitudinally arranged brackets having wedge shaped ways therethrough on the side of the shell, and wings having wedge members on the inner ends thereof received in the ways, and said wings providing therebetween air ducts for the fan.

9. A shell adapted to be dropped or thrown from an air craft or the like, comprising a body having an explosive charge therein and a central tube therethrough, a disk secured to one end of the body, a nose piece removably secured to the disk having its inner end provided with a pocket and having a central opening communicating with the pocket, a cap piece on the other end of the body, a tail piece secured to the cap, a fuse carried by the latter and communicating with the explosive charge, a cap for the fuse, a hammer carried by the tail piece, a stem therefor, a head for said stem, a rotatable fan on the tail piece normally engaging the hammer for holding the same out of cap contacting position, said fan designed to be influenced by air resistance when the shell is projected to cause the same to move off of the tail piece and to contact with the head of the hammer to bring the latter to cap exploding position, a detonator rod extending through the shell, guided by the tube therein and normally contacting with the hammer, a plate secured to the detonator rod and arranged in the pocket of the nose piece, spring means for normally retaining said plate against the inner wall of the pocket, striking pins carried by the plate, primer pins carried by the disk for the explosive charge and disposed opposite the striking pins of the plate, and wings on the side of the shell.

10. A shell adapted to be dropped or thrown from an air craft or the like comprising a body divided into a plurality of compartments one of each containing an explosive, another shrapnel balls, and the other a liquid fuel, a tube extending centrally through the body of the shell, a nose piece on one end of the shell, a tail piece on the other end of the shell, primer caps between the nose piece and the explosive charge, a fuse carried by the tail piece for the explosive charge, a cap for the latter, a hammer slidable in the tail piece and projecting therethrough, a stem for the hammer, a head for the latter, a rotatable fan on the tail piece normally contacting with the hammer to hold the same away from cap engaging position, said fan designed to be actuated by the resistance of air when the shell is projected to cause the same to travel off of the tail to contact with the head of the hammer to bring the latter in cap contacting position, a detonator rod passing centrally through the shell guided by the tube therein and having its inner end normally contacting with the hammer, striking pins carried by the detonator rod disposed to engage with the primer caps in the shell, spring means for normally retaining such pins out of such engagement, an auxiliary nose comprising a disk-like member removably secured to the outer end of the primer rod, said auxiliary nose having hooked elements formed therewith, an extension for the primer rod, and wings on the side of the shell.

11. A shell adapted to be dropped or thrown from an air craft or the like comprising a casing constructed of a plurality of nested cylinders and a tube extending through the inner cylinder, and said cylinders dividing the casing into compartments, a nose piece on one end of the casing, a tail piece on the other end of the casing, a high explosive in the central compartment of the casing, shrapnel balls in the next compartment, and an inflammable liquid in the outer compartment, a fuse carried by the tail piece for the explosive, a cap therefor, a slidable hammer for the cap, a rotatable propeller fan on the nose piece normally engaging with the hammer to hold the same out of cap engaging position or designed, when influenced by air resistance to explode the cap, wings on the sides of the casing, a detonator rod for the high explosive guided in the tube of the shell and projecting through the nose piece thereof and locked against movement to explode the shell by the hammer, when the said hammer is inactive and spring means for also holding the rod against movement in such direction.

In testimony whereof I affix my signature.

JOHN W. NIEUKIRK.